Feb. 2, 1960 T. H. OSTER 2,923,411
FUEL FILTER
Filed March 14, 1956
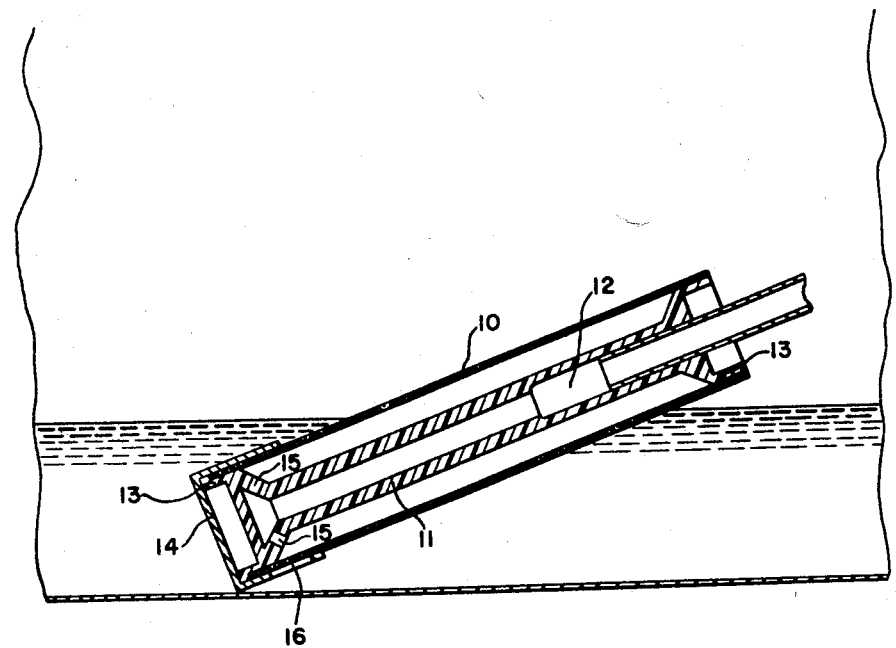
T. H. OSTER
INVENTOR.
BY E. C. McRae
J. R. Faulkner
R. T. Seeger
ATTORNEYS

United States Patent Office 2,923,411
Patented Feb. 2, 1960

2,923,411
FUEL FILTER

Thomas H. Oster, Dearborn, Mich., assignor to Ford Motor Company, Dearborn, Mich., a corporation of Delaware Application March 14, 1956, Serial No. 571,430

3 Claims. (Cl. 210—172)

This invention relates to an apparatus for the filtration of liquids and more especially to a fuel filter adapted for installation in the fuel tank of mobile internal combustion engine driven vehicles.

In United States Letters Patents 2,711,828 issued June 28, 1955, to Webb et al. there is disclosed the use of a filtering medium comprising two or more layers of plastic cloth. Using a two layer filter of any of the many commercially available polyvinyl plastics, a very successful gasoline filter has been constructed which filters out solid contaminants and resists the passage of water and air once such filter has been thoroughly wetted with gasoline. While in many instances it is desirable to arrange the plastic cloth layers so that the threads of the various layers are arranged at a substantial angle to similar threads in an adjacent layer, this precaution can usually be dispensed with.

Due to the peculiar property of filters of this type of preferentially passing gasoline once they are thoroughly gasoline wetted. It has been found possible to fabricate these filters in a generally cylindrical shape and mount this cylinder with the lower end resting upon or just clearing the bottom of the fuel tank and the axis of the cylinder making an angle of about twenty-two degrees with the horizontal. Substantially all of the side walls of the cylinder is active filtration area, and it is possible to completely drain the gasoline tank through the filter despite the fact that substantial portions of the filtering area are above the level of the gasoline in the tank as the gasoline supply approaches exhaustion.

The figure of drawing depicts a section of such a cylindrical filter mounted in a fuel tank. In this drawing the actual filtering medium 10 is supported upon enlarged sections 13 of axial member 11. While it is not essential, it is convenient to fabricate axial member 11 of any plastic which may readily be thermally fused to the plastic cloth filtering medium 10. The upper enlarged section 13 is provided with conduit receiving opening 12 into which is thrust the tank end of the fuel line. Apertures 15 are provided in lower enlarged section 13 to permit fuel to flow from the interior of filtering medium 10 into axial member 11.

Filtering medium 10 consists of a plurality of superimposed layers of plastic and is provided at its lower end with means for rendering the lower end at least partially impermeable to the flow of fuel. In the drawing this means is shown as cap 14 which may readily be made of any suitable plastic or metal. Cap 14 is provided with an opening 16 which is designed to permit the entry of fuel into the lower end of the filter medium at a slow rate.

The object of cap 14 and opening 16 is to throttle the flow of fuel into the interior of the filter as the fuel supply in the tank approaches exhaustion. The size of opening 16 should be selected so that sufficient fuel may be drawn therethrough and filtered to permit the vehicle to operate at slow speeds (twenty to twenty-five miles per hour) but not to operate at normal operating speeds. In this manner the operator is given a positive indication that the fuel situation is critical but is still enabled to proceed to a fuel supply at a slow speed.

While the embodiment of the invention shown in the drawing depicts a cap placed over filtering medium 10, essentially the same result can be attained by any procedure which will render all except a small portion of the lower end of filtering medium 10 impermeable to gasoline. This may be done by fusing the lower end of the application of heat, preferably by conventional dielectric heating. In such case a small area would be left unfused to permit a throttled flow of fuel. Conversely, heat may be applied uniformly to the entire lower end of filtering medium 10 to an extent sufficient to reduce the permeability of this area to the desired extent.

I claim as my invention:

1. A fuel supply system for use in an internal combustion engine driven motor vehicle, comprising a liquid fuel storage tank, liquid fuel filtering means and a conduit for the withdrawal of liquid fuel from the storage tank, said liquid fuel filtration means comprising a plurality of superimposed layers of plastic cloth fabricated into an elongated structure enclosing a central portion, said conduit terminating in said enclosed central portion and the lower end of said filtration means having interstices substantially smaller than the other portions of said filtration means whereby said lower end is rendered less permeable to liquid fuel to a degree such that said lower end is capable of passing sufficient fuel to operate the motor vehicle at slow rates of speed, but not at normal rates of speed.

2. A fuel supply system for use in an internal combustion engine driven motor vehicle, comprising a liquid fuel storage tank, liquid fuel filtering means and a conduit for the withdrawal of liquid fuel from the storage tank, said liquid fuel filtration means comprising a plurality of superimposed layers of plastic cloth fabricated into an elongated structure enclosing a central portion the lower end of said filtration means being enclosed in a liquid fuel impermeable cap which has been perforated to permit the lower end of said filtration means to pass sufficient fuel to operate the motor vehicle at slow rates of speed, but not at normal speeds.

3. A fuel supply system for use in an internal combustion engine driven motor vehicle, comprising a liquid fuel storage tank, liquid fuel filtering means and a conduit for the withdrawal of liquid fuel from the storage tank, said liquid fuel filtration means comprising a plurality of superimposed layers of plastic cloth fabricated into an elongated structure enclosing a central portion, said conduit terminating in said enclosed central portion the lower end of said filtration means having its interstices closed except for a restricted area whereby said lower end is rendered less permeable to liquid fuel to a degree such that said lower end is capable of passing sufficient fuel to operate the motor vehicle at slow rates of speed, but not at normal speeds.

References Cited in the file of this patent
UNITED STATES PATENTS

| | | |
|---|---|---|
| 856,361 | Neiburg | June 11, 1907 |
| 1,394,011 | Hills | Oct. 18, 1921 |
| 1,470,775 | Stephens | Oct. 16, 1923 |
| 2,028,520 | Phillips | Jan. 21, 1936 |
| 2,262,628 | Wilson | Nov. 11, 1941 |
| 2,424,211 | Webb | July 15, 1947 |
| 2,601,894 | Morse | July 1, 1952 |
| 2,711,828 | Webb et al. | June 28, 1955 |
| 2,725,986 | Marvel | Dec. 6, 1955 |
| 2,788,125 | Webb | Apr. 9, 1957 |

FOREIGN PATENTS

| | | |
|---|---|---|
| 110,800 | Australia | June 11, 1940 |
| 461,581 | Great Britain | Feb. 19, 1937 |